(12) United States Patent
Trabelsi et al.

(10) Patent No.: US 11,512,243 B2
(45) Date of Patent: Nov. 29, 2022

(54) MICROEMULSIONS COMPRISING AN ALKYL PROPOXYLATED SULFATE SURFACTANT, AND RELATED METHODS

(71) Applicant: Flotek Chemistry, LLC, Houston, TX (US)

(72) Inventors: Siwar Trabelsi, Marlborough, MA (US); Randall M. Hill, Honor, MI (US)

(73) Assignee: Flotek Chemistry, LLC, Houston, TX (US)

( * ) Notice: Subject to any disclaimer, the term of this patent is extended or adjusted under 35 U.S.C. 154(b) by 1 day.

(21) Appl. No.: 17/078,258

(22) Filed: Oct. 23, 2020

(65) Prior Publication Data
US 2022/0127516 A1 Apr. 28, 2022

(51) Int. Cl.
*C09K 8/584* (2006.01)
*E21B 43/16* (2006.01)
*E21B 43/26* (2006.01)

(52) U.S. Cl.
CPC .............. *C09K 8/584* (2013.01); *E21B 43/16* (2013.01); *E21B 43/26* (2013.01)

(58) Field of Classification Search
CPC ....................................................... C09K 8/58
See application file for complete search history.

(56) References Cited

U.S. PATENT DOCUMENTS

| 3,060,210 A | 4/1961 | De Groote |
| 3,047,062 A | 7/1962 | Meadors |
| 3,347,789 A | 10/1967 | Dickson et al. |
| 3,368,624 A | 2/1968 | Heuer et al. |
| 3,483,923 A | 12/1969 | Darley |
| 3,710,865 A | 1/1973 | Kiel |
| 3,756,319 A | 9/1973 | Holm et al. |
| 3,760,881 A | 9/1973 | Kiel |

(Continued)

FOREIGN PATENT DOCUMENTS

| CA | 2904726 A1 | 3/2017 |
| CN | 102127414 A | 7/2011 |

(Continued)

OTHER PUBLICATIONS

[No Author Listed], The HLB system: a time-saving guide to emulsifier selection. ICI Americas Inc. 1976. 22 pages.
ADM, Evolution Chemicals E5789-117 Description. Jun. 2014. 1 page.
Brost et al., Surfactants assist water-in-oil monitoring by fluorescence. World Oil. Oct. 2008;229(10):12 pages.

(Continued)

*Primary Examiner* — Angela M DiTranni Leff
*Assistant Examiner* — Avi T Skaist
(74) *Attorney, Agent, or Firm* — Wolf, Greenfield & Sacks, P.C.

(57) ABSTRACT

Microemulsions comprising an alkyl propoxylated sulfate surfactant and related methods, including methods of use in the treatment of subterranean formations, such as oil and condensate wells, are provided. In some embodiments, the microemulsions and/or methods of use achieve ultra-low interfacial tensions (i.e. less than or equal to 0.01 mN/m) between a wide variety of crude oils and well treatment fluids at various reservoir conditions. In some embodiments, the microemulsion comprises water, an anionic alkyl propoxylated sulfate surfactant, a solvent (e.g., a terpene solvent), and a co-solvent. In some embodiments, the microemulsion further comprises a second and/or third surfactant (e.g., a nonionic and/or an anionic surfactant).

14 Claims, 2 Drawing Sheets

(56) References Cited

U.S. PATENT DOCUMENTS

| | | |
|---|---|---|
| 3,850,248 A | 11/1974 | Carney |
| 3,919,411 A | 11/1975 | Glass et al. |
| 4,005,020 A | 1/1977 | McCormick |
| 4,206,809 A | 6/1980 | Jones |
| 4,233,165 A | 11/1980 | Salathiel et al. |
| 4,276,935 A | 7/1981 | Hessert et al. |
| 4,360,061 A | 11/1982 | Canter et al. |
| 4,414,128 A | 11/1983 | Goffinet |
| 4,472,291 A | 9/1984 | Rosano |
| 4,511,488 A | 4/1985 | Matta |
| 4,650,000 A | 3/1987 | Andreasson et al. |
| 4,844,756 A | 7/1989 | Forsberg |
| 5,008,026 A | 4/1991 | Gardner et al. |
| 5,034,140 A | 7/1991 | Gardner et al. |
| 5,076,954 A | 12/1991 | Loth et al. |
| 5,083,613 A | 1/1992 | Gregoli et al. |
| 5,095,989 A | 3/1992 | Prukop |
| 5,217,531 A | 6/1993 | Cheung |
| 5,247,995 A | 9/1993 | Tjon-Joe-Pin et al. |
| 5,310,002 A | 5/1994 | Blauch et al. |
| 5,356,482 A | 10/1994 | Mehta et al. |
| 5,567,675 A | 10/1996 | Romocki |
| 5,587,354 A | 12/1996 | Duncan, Jr. |
| 5,587,357 A | 12/1996 | Rhinesmith |
| 5,604,195 A | 2/1997 | Misselyn et al. |
| 5,652,200 A | 7/1997 | Davies et al. |
| 5,665,689 A | 9/1997 | Durbut |
| 5,676,763 A | 10/1997 | Salisbury et al. |
| 5,697,458 A | 12/1997 | Carney |
| 5,707,940 A | 1/1998 | Bush et al. |
| 5,762,138 A | 6/1998 | Ford et al. |
| 5,784,386 A | 7/1998 | Norris |
| 5,811,383 A | 9/1998 | Klier et al. |
| 5,830,831 A | 11/1998 | Chan et al. |
| 5,874,386 A | 2/1999 | Chan et al. |
| 5,925,233 A | 7/1999 | Miller et al. |
| 5,975,206 A | 11/1999 | Woo et al. |
| 5,977,032 A | 11/1999 | Chan |
| 5,990,072 A | 11/1999 | Gross et al. |
| 5,996,692 A | 12/1999 | Chan et al. |
| 6,046,140 A | 4/2000 | Woo et al. |
| 6,090,754 A | 7/2000 | Chan et al. |
| 6,110,885 A | 8/2000 | Chan |
| 6,112,814 A | 9/2000 | Chan et al. |
| 6,165,946 A | 12/2000 | Mueller et al. |
| 6,173,776 B1 | 1/2001 | Furman et al. |
| 6,191,090 B1 | 2/2001 | Mondin et al. |
| 6,228,830 B1 | 5/2001 | Vlasblom |
| 6,260,621 B1 | 7/2001 | Furman et al. |
| 6,302,209 B1 | 10/2001 | Thompson, Sr. et al. |
| 6,364,020 B1 | 4/2002 | Crawshaw et al. |
| 6,486,115 B1 | 11/2002 | Weaver et al. |
| 6,581,687 B2 | 6/2003 | Collins et al. |
| 6,593,279 B2 | 7/2003 | Von Krosigk et al. |
| 6,613,720 B1 | 9/2003 | Feraud et al. |
| 6,729,402 B2 | 5/2004 | Chang et al. |
| 6,770,603 B1 | 8/2004 | Sawdon et al. |
| 6,793,025 B2 | 9/2004 | Patel et al. |
| 6,800,593 B2 | 10/2004 | Dobson, Jr. et al. |
| 6,818,595 B2 | 11/2004 | Benton et al. |
| 6,911,417 B2 | 6/2005 | Chan et al. |
| 6,914,040 B2 | 7/2005 | Deak et al. |
| 6,939,832 B2 | 9/2005 | Collins |
| 6,984,610 B2 | 1/2006 | VonKrosigk et al. |
| 7,021,378 B2 | 4/2006 | Prukop |
| 7,122,509 B2 | 10/2006 | Sanner et al. |
| 7,134,496 B2 | 11/2006 | Jones et al. |
| 7,205,262 B2 | 4/2007 | Schwartz et al. |
| 7,205,264 B2 | 4/2007 | Boles |
| 7,231,976 B2 | 6/2007 | Berry et al. |
| 7,380,606 B2 | 6/2008 | Pursley et al. |
| 7,392,844 B2 | 7/2008 | Berry et al. |
| 7,407,915 B2 | 8/2008 | Jones et al. |
| 7,468,402 B2 | 12/2008 | Yang et al. |
| 7,481,273 B2 | 1/2009 | Javora et al. |
| 7,514,390 B2 | 4/2009 | Chan |
| 7,514,391 B2 | 4/2009 | Chan |
| 7,533,723 B2 | 5/2009 | Hughes et al. |
| 7,543,644 B2 | 6/2009 | Huang et al. |
| 7,543,646 B2 | 6/2009 | Huang et al. |
| 7,544,639 B2 | 6/2009 | Pursley et al. |
| 7,547,665 B2 | 6/2009 | Welton et al. |
| 7,552,771 B2 | 6/2009 | Eoff et al. |
| 7,559,369 B2 | 7/2009 | Roddy et al. |
| 7,581,594 B2 | 9/2009 | Tang |
| 7,615,516 B2 | 11/2009 | Yang et al. |
| 7,621,334 B2 | 11/2009 | Welton et al. |
| 7,622,436 B2 | 11/2009 | Tuzi et al. |
| 7,655,603 B2 | 2/2010 | Crews |
| 7,677,311 B2 | 3/2010 | Abad et al. |
| 7,687,439 B2 | 3/2010 | Jones et al. |
| 7,709,421 B2 | 5/2010 | Jones et al. |
| 7,712,534 B2 | 5/2010 | Bryant et al. |
| 7,727,936 B2 | 6/2010 | Pauls et al. |
| 7,727,937 B2 | 6/2010 | Pauls et al. |
| 7,730,958 B2 | 6/2010 | Smith |
| 7,825,073 B2 | 11/2010 | Welton et al. |
| 7,833,943 B2 | 11/2010 | Van Zanten et al. |
| 7,838,467 B2 | 11/2010 | Jones et al. |
| 7,846,877 B1 | 12/2010 | Robb |
| 7,851,414 B2 | 12/2010 | Yang et al. |
| 7,855,168 B2 | 12/2010 | Fuller et al. |
| 7,857,051 B2 | 12/2010 | Abad et al. |
| 7,886,824 B2 | 2/2011 | Kakadjian et al. |
| 7,893,010 B2 | 2/2011 | Ali et al. |
| 7,902,123 B2 | 3/2011 | Harrison et al. |
| 7,906,464 B2 | 3/2011 | Davidson |
| 7,910,524 B2 | 3/2011 | Welton et al. |
| 7,931,088 B2 | 4/2011 | Stegemoeller et al. |
| 7,960,314 B2 | 6/2011 | Van Zanten et al. |
| 7,960,315 B2 | 6/2011 | Welton et al. |
| 7,963,720 B2 | 6/2011 | Hoag et al. |
| 7,971,659 B2 | 7/2011 | Gatlin et al. |
| 7,976,241 B2 | 7/2011 | Hoag et al. |
| 7,989,404 B2 | 8/2011 | Kakadjian et al. |
| 7,992,656 B2 | 8/2011 | Dusterhoft et al. |
| 7,998,911 B1 | 8/2011 | Berger et al. |
| 8,043,996 B2 | 10/2011 | Harris |
| 8,053,396 B2 | 11/2011 | Huff et al. |
| 8,053,397 B2 | 11/2011 | Huang et al. |
| 8,057,682 B2 | 11/2011 | Hoag et al. |
| 8,091,644 B2 | 1/2012 | Clark et al. |
| 8,091,645 B2 | 1/2012 | Quintero et al. |
| 8,091,646 B2 | 1/2012 | Quintero et al. |
| 8,100,190 B2 | 1/2012 | Weaver et al. |
| 8,148,303 B2 | 4/2012 | Van Zanten et al. |
| 8,183,182 B2 | 5/2012 | Oliveira et al. |
| 8,206,062 B2 | 6/2012 | Hoag et al. |
| 8,207,096 B2 | 6/2012 | van Zanten et al. |
| 8,210,263 B2 | 7/2012 | Quintero et al. |
| 8,220,546 B2 | 7/2012 | Kakadjian et al. |
| 8,227,382 B2 | 7/2012 | Dakin et al. |
| 8,231,947 B2 | 7/2012 | Vaidya et al. |
| 8,235,120 B2 | 8/2012 | Quintero et al. |
| 8,242,059 B2 | 8/2012 | Sawdon |
| 8,293,687 B2 | 10/2012 | Giffin |
| 8,342,241 B2 | 1/2013 | Hartshorne et al. |
| 8,349,771 B2 | 1/2013 | Seth et al. |
| 8,356,667 B2 | 1/2013 | Quintero et al. |
| 8,357,639 B2 | 1/2013 | Quintero et al. |
| 8,372,789 B2 | 2/2013 | Harris et al. |
| 8,383,560 B2 | 2/2013 | Pich et al. |
| 8,403,051 B2 | 3/2013 | Huang et al. |
| 8,404,623 B2 | 3/2013 | Robb et al. |
| 8,413,721 B2 | 4/2013 | Welton et al. |
| 8,415,279 B2 | 4/2013 | Quintero et al. |
| 8,431,620 B2 | 4/2013 | Del Gaudio et al. |
| 8,453,741 B2 | 6/2013 | van Zanten |
| 8,499,832 B2 | 8/2013 | Crews et al. |
| 8,517,100 B2 | 8/2013 | Ali et al. |
| 8,517,104 B2 | 8/2013 | Kieffer |
| 8,524,643 B2 | 9/2013 | Huff et al. |
| 8,551,926 B2 | 10/2013 | Huang et al. |
| 8,592,350 B2 | 11/2013 | van Zanten et al. |

(56) References Cited

U.S. PATENT DOCUMENTS

| | | |
|---|---|---|
| 8,684,079 B2 | 4/2014 | Wattenbarger et al. |
| 8,778,850 B2 | 7/2014 | Andrecola |
| 8,865,632 B1 | 10/2014 | Parnell et al. |
| 8,916,508 B2 | 12/2014 | Parnell et al. |
| 9,068,108 B2 | 6/2015 | Hill et al. |
| 9,200,192 B2 | 12/2015 | Zelenev et al. |
| 9,222,013 B1 | 12/2015 | Champagne et al. |
| 9,321,955 B2 | 4/2016 | Hill et al. |
| 9,428,683 B2 | 8/2016 | Hill et al. |
| 9,464,223 B2 | 10/2016 | Champagne et al. |
| 9,505,970 B2 | 11/2016 | Vaughn et al. |
| 9,790,414 B2 | 10/2017 | Champagne et al. |
| 9,809,741 B2 | 11/2017 | Hill et al. |
| 9,850,418 B2 | 12/2017 | Champagne et al. |
| 9,868,893 B2 | 1/2018 | Saboowala et al. |
| 9,884,988 B2 | 2/2018 | Dismuke et al. |
| 9,890,624 B2 | 2/2018 | Portwood |
| 9,890,625 B2 | 2/2018 | Portwood |
| 9,951,264 B2 | 4/2018 | Penny et al. |
| 9,957,779 B2 | 5/2018 | Fursdon-Welsh et al. |
| 9,994,762 B2 | 6/2018 | Hill et al. |
| 10,000,693 B2 | 6/2018 | Hill et al. |
| 10,005,948 B2 | 6/2018 | Champagne et al. |
| 10,053,619 B2 | 8/2018 | Saboowala et al. |
| 10,081,760 B2 | 9/2018 | Ngantung et al. |
| 10,087,361 B2 | 10/2018 | Hill et al. |
| 10,144,862 B2 | 12/2018 | Zelenev et al. |
| 10,196,557 B2 | 2/2019 | Hill et al. |
| 10,280,360 B2 | 5/2019 | Champagne et al. |
| 10,287,483 B2 | 5/2019 | Saboowala et al. |
| 10,294,757 B2 | 5/2019 | Fursdon-Welsh et al. |
| 10,294,764 B2 | 5/2019 | Champagne et al. |
| 10,308,859 B2 | 6/2019 | Champagne et al. |
| 10,421,707 B2 | 9/2019 | Trabelsi et al. |
| 10,544,355 B2 | 1/2020 | Hill et al. |
| 10,577,531 B2 | 3/2020 | Pursley et al. |
| 10,590,332 B2 | 3/2020 | Penny et al. |
| 10,696,887 B2 | 6/2020 | Dismuke et al. |
| 10,703,960 B2 | 7/2020 | Hill et al. |
| 10,717,919 B2 | 7/2020 | Germack et al. |
| 10,731,071 B2 | 8/2020 | Saboowala et al. |
| 10,738,235 B2 | 8/2020 | Hill et al. |
| 2001/0007663 A1 | 7/2001 | Von Corswant |
| 2003/0022944 A1 | 1/2003 | Gumkowski et al. |
| 2003/0069143 A1 | 4/2003 | Collins |
| 2003/0232095 A1 | 12/2003 | Garti et al. |
| 2006/0014648 A1 | 1/2006 | Milson et al. |
| 2006/0211593 A1 | 9/2006 | Smith et al. |
| 2006/0258541 A1 | 11/2006 | Crews |
| 2007/0123445 A1 | 5/2007 | Tuzi et al. |
| 2007/0293404 A1 | 12/2007 | Hutchins et al. |
| 2007/0295368 A1 | 12/2007 | Harrison et al. |
| 2008/0274918 A1 | 11/2008 | Quintero et al. |
| 2008/0287324 A1 | 11/2008 | Pursley et al. |
| 2009/0078415 A1 | 3/2009 | Fan et al. |
| 2009/0137432 A1 | 5/2009 | Sullivan et al. |
| 2009/0159288 A1 | 6/2009 | Horvath Szabo et al. |
| 2009/0200027 A1 | 8/2009 | Kakadjian et al. |
| 2009/0221456 A1 | 9/2009 | Harrison et al. |
| 2009/0260819 A1 | 10/2009 | Kurian et al. |
| 2009/0275488 A1 | 11/2009 | Zamora et al. |
| 2009/0281004 A1 | 11/2009 | Ali et al. |
| 2010/0022421 A1 | 1/2010 | Gutierrez et al. |
| 2010/0173805 A1 | 7/2010 | Pomerleau |
| 2010/0216670 A1 | 8/2010 | Del Gaudio et al. |
| 2010/0243248 A1 | 9/2010 | Golomb et al. |
| 2010/0252267 A1 | 10/2010 | Harris et al. |
| 2010/0263863 A1 | 10/2010 | Quintero et al. |
| 2010/0272765 A1 | 10/2010 | Ho O et al. |
| 2010/0307757 A1 | 12/2010 | Blow et al. |
| 2011/0021386 A1 | 1/2011 | Ali et al. |
| 2011/0136706 A1 | 6/2011 | Carroll et al. |
| 2011/0146983 A1 | 6/2011 | Sawdon |
| 2011/0190174 A1 | 8/2011 | Weerasooriya et al. |
| 2011/0220353 A1 | 9/2011 | Bittner et al. |
| 2011/0237467 A1 | 9/2011 | Cornette et al. |
| 2011/0253365 A1 | 10/2011 | Crews et al. |
| 2011/0290491 A1 | 12/2011 | Gupta et al. |
| 2012/0004146 A1 | 1/2012 | Van Zanten et al. |
| 2012/0015852 A1 | 1/2012 | Quintero et al. |
| 2012/0071366 A1 | 3/2012 | Falana et al. |
| 2012/0080232 A1 | 4/2012 | Muller et al. |
| 2012/0129738 A1 | 5/2012 | Gupta et al. |
| 2012/0149626 A1 | 6/2012 | Fluck et al. |
| 2012/0168165 A1 | 7/2012 | Holcomb et al. |
| 2012/0181019 A1 | 7/2012 | Saini et al. |
| 2012/0193095 A1 | 8/2012 | Varadaraj et al. |
| 2012/0208726 A1 | 8/2012 | Smith et al. |
| 2012/0234548 A1 | 9/2012 | Dyer |
| 2012/0241155 A1 | 9/2012 | Ali et al. |
| 2012/0241220 A1 | 9/2012 | Quintero et al. |
| 2012/0255887 A1 | 10/2012 | Holms et al. |
| 2012/0261120 A1 | 10/2012 | Del Gaudio et al. |
| 2012/0285690 A1 | 11/2012 | Weaver et al. |
| 2012/0285694 A1 | 11/2012 | Morvan et al. |
| 2012/0318504 A1 | 12/2012 | Fan et al. |
| 2012/0318515 A1 | 12/2012 | Cawiezel et al. |
| 2012/0322697 A1 | 12/2012 | Zhang |
| 2012/0325492 A1 | 12/2012 | Fefer et al. |
| 2013/0029883 A1 | 1/2013 | Dismuke et al. |
| 2013/0048281 A1 | 2/2013 | Van Zanten et al. |
| 2013/0079255 A1 | 3/2013 | Del Gaudio et al. |
| 2013/0109597 A1 | 5/2013 | Sarkar et al. |
| 2013/0133886 A1 | 5/2013 | Quintero |
| 2013/0137611 A1 | 5/2013 | Pierce et al. |
| 2013/0146288 A1 | 6/2013 | Smith et al. |
| 2013/0146545 A1 | 6/2013 | Pabalan et al. |
| 2013/0153232 A1 | 6/2013 | Bobier et al. |
| 2013/0153234 A1 | 6/2013 | Bobier et al. |
| 2013/0192826 A1 | 8/2013 | Kurian et al. |
| 2013/0233559 A1 | 9/2013 | van Zanten et al. |
| 2013/0244913 A1 | 9/2013 | Maberry et al. |
| 2013/0261033 A1 | 10/2013 | Nguyen |
| 2013/0292121 A1 | 11/2013 | Penny et al. |
| 2014/0005079 A1 | 1/2014 | Dahanayake et al. |
| 2014/0110344 A1 | 4/2014 | Hoag et al. |
| 2014/0202700 A1 | 7/2014 | Blair |
| 2014/0262274 A1 | 9/2014 | Dismuke et al. |
| 2014/0262288 A1 | 9/2014 | Penny et al. |
| 2014/0274822 A1 | 9/2014 | Dismuke et al. |
| 2014/0284053 A1 | 9/2014 | Germack |
| 2014/0332212 A1 | 11/2014 | Ayers et al. |
| 2014/0371115 A1 | 12/2014 | Hill et al. |
| 2015/0053404 A1 | 2/2015 | Penny et al. |
| 2015/0105302 A1 | 4/2015 | Pursley et al. |
| 2015/0197683 A1 | 7/2015 | Hategan et al. |
| 2015/0247082 A1 | 9/2015 | Rea |
| 2015/0247381 A1 | 9/2015 | Pursley |
| 2015/0247393 A1* | 9/2015 | Portwood ............ E21B 43/164 166/275 |
| 2015/0329767 A1* | 11/2015 | Vaughn .................. C09K 8/42 166/305.1 |
| 2016/0003018 A1 | 1/2016 | Saboowala et al. |
| 2016/0017204 A1 | 1/2016 | Hill et al. |
| 2016/0024890 A1 | 1/2016 | Fursdon-Welsh et al. |
| 2016/0032172 A1 | 2/2016 | Pursley et al. |
| 2016/0075934 A1 | 3/2016 | Champagne et al. |
| 2016/0096989 A1 | 4/2016 | Ngantung et al. |
| 2016/0194550 A1 | 7/2016 | Hill et al. |
| 2016/0257911 A1* | 9/2016 | Denison .................. C11D 3/188 |
| 2016/0312106 A1 | 10/2016 | Penny et al. |
| 2017/0275518 A1 | 9/2017 | Trabelsi et al. |
| 2017/0313925 A1 | 11/2017 | Dismuke et al. |
| 2017/0335179 A1 | 11/2017 | Ngantung et al. |
| 2017/0368560 A1 | 12/2017 | McElhany et al. |
| 2018/0037792 A1 | 2/2018 | Champagne et al. |
| 2018/0134941 A1 | 5/2018 | Saboowala et al. |
| 2018/0171213 A1 | 6/2018 | Hill et al. |
| 2018/0282611 A1 | 10/2018 | Hill et al. |
| 2018/0305601 A1 | 10/2018 | Champagne et al. |
| 2019/0055457 A1 | 2/2019 | Smith, Jr. et al. |
| 2019/0055458 A1 | 2/2019 | Smith, Jr. et al. |

(56) References Cited

U.S. PATENT DOCUMENTS

| | | |
|---|---|---|
| 2019/0055459 A1 | 2/2019 | Zelenev et al. |
| 2019/0085236 A1 | 3/2019 | Saboowala et al. |
| 2019/0090476 A1 | 3/2019 | Smith, Jr. et al. |
| 2019/0100689 A1 | 4/2019 | Zelenev et al. |
| 2019/0169492 A1 | 6/2019 | Hill et al. |
| 2019/0241796 A1 | 8/2019 | Mast et al. |
| 2019/0264094 A1 | 8/2019 | Hill et al. |
| 2019/0284467 A1 | 9/2019 | Forbes et al. |
| 2019/0315674 A1 | 10/2019 | Trabelsi et al. |
| 2019/0316021 A1 | 10/2019 | Champagne et al. |
| 2020/0157412 A1 | 5/2020 | Hill et al. |
| 2020/0216749 A1 | 7/2020 | Penny et al. |
| 2020/0332177 A1 | 10/2020 | Hill et al. |

FOREIGN PATENT DOCUMENTS

| | | |
|---|---|---|
| CN | 102277143 B | 3/2013 |
| CN | 103614128 A | 3/2014 |
| CN | 103642477 A | 3/2014 |
| EP | 1 051 237 B1 | 11/2003 |
| EP | 1 378 554 A1 | 1/2004 |
| EP | 1 786 879 B1 | 2/2012 |
| EP | 2 195 400 B1 | 8/2012 |
| EP | 1 880 081 B1 | 3/2013 |
| GB | 1105975 A | 3/1968 |
| GB | 1177134 A | 1/1970 |
| WO | WO 1999/049182 A1 | 9/1999 |
| WO | WO 2005/048706 A2 | 6/2005 |
| WO | WO 2007/011475 A1 | 1/2007 |
| WO | WO 2012/158645 A1 | 11/2012 |
| WO | WO 2017/099709 A1 | 6/2017 |
| WO | WO 2018/111229 A1 | 6/2018 |
| WO | WO 2018/218177 A2 | 11/2018 |

OTHER PUBLICATIONS

Champagne et al., Critical assessment of microemulsion technology for enhancing fluid recovery from tight gas formations and propped fractures. SPE European Formation Damage Conference. Noordwijk, The Netherlands. Jun. 7-10, 2011. SPE-144095. 10 pages.

Crafton et al., Micro-emulsion effectiveness for twenty four wells, Eastern Green River, Wyoming. 2009 SPE Rocky Mountain Petroleum Technology Conference. Denver, Colorado, USA, Apr. 14-16, 2009. SPE-123280. 13 pages.

Haw, The HLB system: a time saving guide to surfactant selection. Presentation to the Midwest chapter of the society of cosmetic chemists. Uniqema. Mar. 9, 2004. 39 slides.

Howard et al., Comparison of flowback aids: understanding their capillary pressure and wetting properties. SPE Production & Operations. Aug. 2010:376-87.

Kunieda et al. Evaluation of hydrophile-lipophile balance (HLB) of nonionic surfactants. J Colloid and Interface Sci. Sep. 1985;107(1):107-21.

Yang et al., Optimizing nanoemulsions as fluid flowback additives in enhancing tight gas production. J Petroleum Sci Eng. 2014;121:122-5.

Zelenev et al., Microemulsion technology for improved fluid recovery and enhanced core permeability to gas. 2009 SPE European Formation Damage Conference. Scheveningen, The Netherlands. May 27-29, 2009. SPE 122109. 13 pages.

Zelenev et al., Microemulsion-assisted fluid recovery and improved permeability to gas in shale formations. 2010 SPE International Symposium and Exhibition on Formation Damage Control. Lafayette, Louisiana, USA. Feb. 10-12, 2010. SPE 127922. 7 pages.

Zelenev, Surface energy of north American shales and its role in interaction of shale with surfactants and microemulsions. SPE International Symposium on Oilfield Chemistry. The Woodlands, Texas, USA. Apr. 11-13, 2011. SPE-141459. 7 pages.

* cited by examiner

MICROEMULSIONS COMPRISING AN ALKYL PROPOXYLATED SULFATE SURFACTANT, AND RELATED METHODS

TECHNICAL FIELD

This disclosure relates to microemulsions comprising an alkyl propoxylated sulfate surfactant and related methods of use in treating subterranean formations (e.g. crude oil and/or condensate wells). In some embodiments, the microemulsions and/or methods of use achieve ultra-low interfacial tensions between crude oils and well treatment fluids.

BACKGROUND

When a drop of one immiscible fluid is immersed in another fluid and comes to rest on a solid surface, such as the rock surfaces of crude oil subterranean formations (also known as reservoirs), the surface area of the drop will exhibit a minimum value due to the forces acting at the fluid-fluid interface and the rock-fluid interface. The forces per unit length acting at the fluid-fluid interface and the rock-fluid interface are referred to as interfacial tensions (IFT). The interfacial tension between two fluids represents the amount of work required to create a new unit of surface area at the interface.

Enhanced oil recovery (EOR) refers to any recovery process that enhances oil production beyond that of primary recovery (e.g. recovery by depletion) and secondary recovery (e.g. recovery by water flooding and/or gas flooding) processes. One example of EOR is known as chemical flooding, which is a tertiary recovery process. Chemical flooding may rely on the addition of one or more chemical compounds to an injected fluid either to reduce the interfacial tension between the reservoir crude oil and the well treatment fluid and/or to improve the sweep efficiency of the well treatment fluid. Chemical flooding may include the use of a microemulsion, surfactant, surfactant/polymer, or alkaline/surfactant/polymer.

Two-thirds of crude oil may remain trapped in the sweep zone of the reservoir rock after primary and secondary recovery. The oil left in the swept zone may then become the main target for tertiary recovery (e.g. chemical flooding). Chemical flooding may involve the injection of a surfactant, alkaline/surfactant, alkaline/surfactant/polymer, or surfactant/polymer to effectively control the phase behavior properties in the oil reservoir, thus mobilizing the trapped crude oil by lowering IFT between the crude oil and the well treatment fluid. In fact, in secondary recovery, oil trapping may be caused by high IFT between the crude oil and the reservoir brine (usually in the order of 20-30 mN/m).

In EOR, the IFT between the crude oil and the well treatment fluid may be important in determining the capillary number (i.e. ratio of viscous to capillary forces) acting on trapped crude oil within porous media. Higher capillary forces (i.e. lower IFT) may achieve higher oil recovery. If the IFT can be reduced to ultra-low values (e.g., less than or equal to 0.01 mN/m) under the specific conditions of the reservoir (e.g. type of crude oil, type and concentration of brine, temperature and pressure of the reservoir), a larger fraction of the residual crude oil trapped in the porous media can be mobilized and recovered.

The phase behavior between the crude oil and the surfactant solution may affect the recovery efficiency. At low salinities, when the crude oil and the surfactant solution are mixed at equal volumes at a specific reservoir temperature, the surfactant may form a lower microemulsion phase in equilibrium with excess oil, which is referred to as "under-optimum." At higher salinities, the surfactant may salt-out of the water phase and form an upper-microemulsion phase in equilibrium with excess water, which is referred to as "over-optimum." At intermediate salt concentrations, a middle phase microemulsion in equilibrium with excess water and oil may be formed. The IFT may undergo a very deep minimum, referred to as "optimum salinity." "Optimum salinity" can be obtained when the surfactant affinity becomes equal for both the crude oil and the water phase. During surfactant flooding, it may be important that the injected surfactant forms an in-situ middle phase microemulsion with the residual crude oil in order to achieve ultra-low IFT to increase the mobility of the crude oil.

However, achieving ultra-low IFT between the crude oil and the surfactant solution at reservoir conditions may not be the only criterion for a successful surfactant flooding process. Maintaining this ultra-low IFT regime during chemical flooding may be important to permit displacement (e.g. mobilization) of the residual crude oil. In fact, the overall surfactant composition during chemical flooding may also change due to surfactant loss by adsorption onto the reservoir surfaces.

Accordingly, high surfactant concentrations are usually required because of the high loss of surfactant, occurring as a result of the surfactant adsorption onto rock surfaces and phase partitioning inside the reservoir. The surfactant concentration may deviate from the "optimum salinity" value as the loss takes place and as a result, the IFT may increase.

Accordingly, to increase crude oil recovery, the concentration and type of surfactant typically need to be optimized for each surfactant flooding application in order to achieve ultra-low IFT between the crude oil and the well treatment fluid at various reservoir conditions. Typically, when one or more surfactants are injected downhole to form an in-situ microemulsion between the crude oil and the well treatment fluid, the IFT for these surfactant flooding systems undergoes a very deep and narrow minimum due to the high sensitivity of the surfactant solutions to compositional changes and reservoir salinity and temperature—meaning that any small change in the surfactant composition will deviate from its minimum IFT.

One goal in surfactant flooding is to maximize the amount of crude oil recovered, while minimizing the chemical cost. However, surfactant flooding design may require a considerable amount of laboratory work in order to screen several surfactants and to determine their mixtures and ratios (by weight) to find the "optimum salinity" to achieve the lowest IFT between the crude oil and the surfactant solution for the specific crude oil at a specific reservoir condition. Each reservoir has different conditions (e.g. different brine, pressure, temperature, mineralogy and crude oil) and typically requires different surfactants, surfactant mixtures, and ratios to achieve ultra-low IFTs. Usually, surfactant formulations are optimized to achieve ultra-low IFT for a specific crude oil and brine at a specific reservoir temperature, and the resulting formulation may not be appropriate for use with another crude oil and brine at a different reservoir temperature. The laboratory time and cost to select, screen, and find an appropriate surfactant formulation for each specific scenario is often excessive and very costly.

To avoid the costly time spent in the lab screening for surfactants in order to find an appropriate surfactant formulation, this present disclosure provides a microemulsion (e.g., a pre-formed, single phase microemulsion) that can, in some embodiments, achieve ultra-low IFT (i.e. less than or equal to 0.01 mN/m) between a wide variety of crude oils and well treatment fluids at various reservoir conditions for use in various well treatment applications, including chemical flooding. In some embodiments, the microemulsion's ability to achieve ultra-low IFT allows a larger fraction of the residual crude oil trapped in the porous media to be mobilized and removed from the subterranean formation in order to maximize crude oil recovery.

BRIEF SUMMARY

Certain aspects are related to microemulsions. In some embodiments, the microemulsion comprises: water; a terpene solvent; a surfactant comprising an anionic alkyl propoxylated sulfate surfactant having a carbon chain length from 12 to 15 carbon atoms and having from 6 to 13 propylene oxide units; and a co-solvent. In some embodiments, the surfactant further comprises an anionic alkyl ether sulfate surfactant having a carbon chain length from 8 to 12 carbon atoms and having from 3 to 6 ethylene oxide units. In some embodiments, the microemulsion further comprises a surfactant comprising an anionic alkyl propoxylated sulfate surfactant having a carbon chain length from 12 to 15 carbon atoms and having from 3 to 5 propylene oxide units. In some embodiments, the microemulsion further comprises a surfactant comprising a nonionic ethoxylated alcohol surfactant having a carbon chain length from 12 to 15 carbon atoms and having from 7 to 12 ethylene oxide units.

In some embodiments, the microemulsion comprises: water; a terpene solvent; a surfactant comprising an anionic alkyl propoxylated sulfate surfactant having a carbon chain length from 12 to 15 carbon atoms and having from 3 to 5 propylene oxide units; and a co-solvent. In some embodiments, the surfactant further comprises an anionic alkyl ether sulfate surfactant having a carbon chain length from 8 to 12 carbon atoms and having from 3 to 6 ethylene oxide units. In some embodiments, the microemulsion further comprises a surfactant comprising alkyl propoxylated sulfate surfactant having a carbon chain length from 12 to 15 carbon atoms and having from 6 to 13 propylene oxide units; and a co-solvent. In some embodiments, the microemulsion further comprises a surfactant comprising a nonionic ethoxylated alcohol surfactant having a carbon chain length from 12 to 15 carbon atoms and having from 7 to 12 ethylene oxide units.

Other advantages and novel features of the present invention will become apparent from the following detailed description of various non-limiting embodiments of the invention when considered in conjunction with the accompanying tables and figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying tables and figures, which the figures are schematic and may not be drawn to scale. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1:
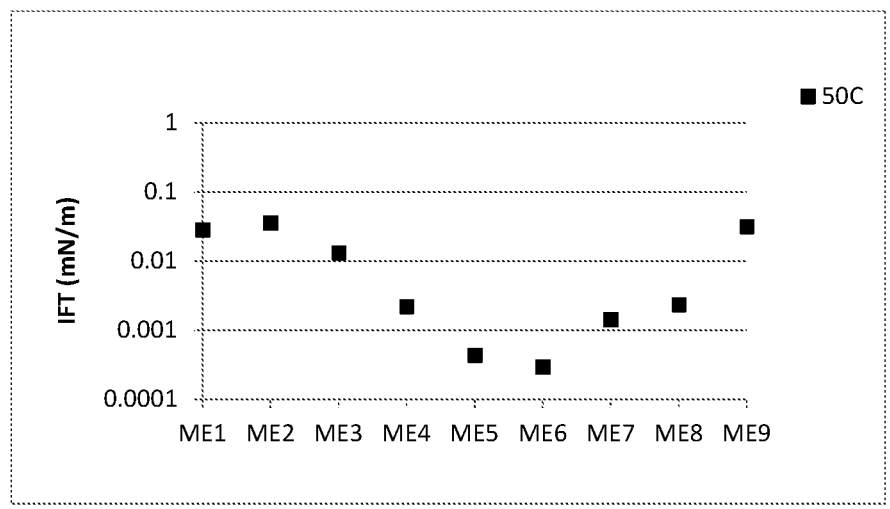
FIG. 1 shows the IFT measured between crude oil 3 (28.6° (American Petroleum Institute (API) gravity, 26.3% saturates, 54.6% aromatics, 17.1% resins, and 2% asphaltenes) and brine 3 (27,100 ppm TDS) at reservoir temperature (50° C.). Microemulsions comprising three surfactants (i.e., ME1 to ME9, described below), were used at 1 gpt to achieve ultra-low IFT. The ratio by weight of the three surfactants to each other within each microemulsion were changed in order to determine the lowest IFT.

Microemulsions comprising an alkyl propoxylated sulfate surfactant and related methods, including methods of use in the treatment of subterranean formations, such as oil and/or condensate wells, are provided. In some embodiments, pre-formed microemulsions described herein may be used in well treatment operations in various aspects of a lifecycle of oil and/or condensate wells, including enhanced oil recovery (EOR), hydraulic fracturing, improved oil recovery (IOR), and wellbore clean outs to achieve ultra-low interfacial tensions between a wide variety of crude oils and well treatment fluids at various reservoir conditions. In some embodiments, methods disclosed herein comprise injecting a pre-formed, single phase microemulsion into a well, wherein the microemulsion exhibits a wide minimum, which makes it less sensitive to compositional changes that might occur due to adsorption of the microemulsion onto the surfaces of the subterranean formation that occurs in well treatment applications. The microemulsion may comprise water, a surfactant, a solvent, and a co-solvent for use in treating subterranean formations of oil and/or condensate wells.

In some embodiments, the microemulsion is less sensitive to compositional changes that might occur due to selective loss of surfactant for a broad range of surfactant ratios. In some embodiments, the minimum IFT obtained is surprisingly broad which makes the microemulsion less sensitive to compositional changes compared to commonly used surfactants in chemical flooding applications. In some embodiments, the type of solvent within the microemulsion can be changed to match the Equivalent Alkane Carbon Number (EACN) of the crude oil used and help achieve ultra-low IFTs.

In some embodiments, cost savings are a significant advantage of using microemulsions described herein. Generally, a considerable amount of laboratory work is dedicated to screen several surfactants, their mixtures and ratios (by weight) to find an appropriate formulation (e.g., lowest IFT between the crude oil and the brine at reservoir conditions for a specific crude oil and brine) since every reservoir is unique, having different characteristics of crude oil, brine, temperature and pressure. In general, a unique microemulsion formulation that is optimized to achieve ultra-low IFT for a specific crude oil/brine at a specific reservoir temperature for one reservoir will not be appropriate for another crude oil/brine in another reservoir. Therefore, laborious work typically needs to be performed for each surfactant flooding application to achieve ultra-low IFT between the specific crude oils and brines. In some embodiments, the microemulsions disclosed herein significantly reduce the time and cost needed to achieve ultra-low IFT with several crude oil and brines at various reservoir conditions.

As used herein, the term microemulsion is given its ordinary meaning in the art and refers to dispersions of one immiscible liquid in another. Microemulsions are clear or transparent, because they contain domains smaller than the wavelength of visible light. In addition, microemulsions are homogeneous, thermodynamically stable, single phases, and form spontaneously with simple mixing of its components, and thus, differ markedly from thermodynamically unstable emulsions, which generally depend upon intense mixing energy for their formation. Microemulsions may be characterized by a variety of advantageous properties including, by not limited to, (i) clarity, (ii) very small particle size, (iii) ultra-low interfacial tensions, (iv) the ability to combine properties of water and oil in a single homogeneous fluid, (v) shelf life stability, (vi) ease of preparation; (vii) compatibility; and (viii) solvency.

The term "microemulsion" should be understood to include microemulsions that have a water continuous phase, or that have an oil continuous phase, or microemulsions that are bicontinuous.

Microemulsion Components

The microemulsion may comprise water, a solvent, a surfactant, and/or a co-solvent. Details of the components of the microemulsion are described in detail below. In some embodiments, the microemulsion may further comprise additional additives (e.g. a demulsifier, an alcohol, a freezing point depression agent, an acid, and/or a salt).

Water

In some embodiments, the microemulsion comprises water (sometimes referred to as an aqueous phase or a water continuous phase). The water may be provided from any suitable source (e.g., sea water, fresh water, deionized water, reverse osmosis water, water from field operations and production, well water, or plant water). The water may also comprise dissolved salts. Non-limiting examples of dissolved salts include salts comprising K, Na, Br, Cr, Cs, or Bi, and also include halides of these metals, including NaCl, KCl, $CaCl_2$, and $MgCl_2$ and combinations thereof.

The water may make up any suitable amount of the microemulsion by weight. The water may make up greater than or equal to 1 wt %, greater than or equal to 2 wt %, greater than or equal to 5 wt %, greater than or equal to 10 wt %, greater than or equal to 15 wt %, greater than or equal to 20 wt %, greater than or equal to 25 wt %, greater than or equal to 30 wt %, greater than or equal to 35 wt %, greater than or equal to 40 wt %, greater than or equal to 45 wt %, greater than or equal to 50 wt %, greater than or equal to 55 wt %, or greater than or equal to 60 wt %, versus the total weight of the microemulsion.

The water may comprise less than or equal to 70 wt %, less than or equal to 65 wt %, less than or equal to 60 wt %, less than or equal to 55 wt %, less than or equal to 50 wt %, less than or equal to 45 wt %, less than or equal to 40 wt %, less than or equal to 35 wt %, less than or equal to 30 wt %, less than or equal to 25 wt %, less than or equal to 20 wt %, less than or equal to 15 wt %, less than or equal to 10 wt %, less than or equal to 5 wt %, less than or equal to 2 wt %, or less than or equal to 1 wt %, versus the total weight of the microemulsion.

Combinations of the above-referenced ranges are also possible (e.g., greater than or equal to 1 wt % and less than or equal to 70 wt % water, greater than or equal to 1 wt % and less than or equal to 60 wt % water, greater than or equal to 15 wt % and less than or equal to 30 wt % water, greater than or equal to 20 wt % and less than or equal to 25 wt % water, or greater than or equal to 10 wt % and less than or equal to 50 wt % water, versus the total weight of the microemulsion). In some embodiments, the water comprises from 20 wt % to 60 wt %, from 30 wt % to 70 wt %, from 30 wt % to 60 wt %, or from 40 wt % to 60 wt %, versus the total weight of the microemulsion.

Solvent

In some embodiments, the microemulsion comprises a solvent (sometimes referred to as a non-aqueous phase or a water discontinuous phase). The solvent may comprise one or more types of solvents (e.g., in the form of a solvent blend). The solvent may make up any suitable amount of the microemulsion by weight. The solvent (e.g., the total solvent or a solvent individually) may make up greater than or equal to 1 wt %, greater than or equal to 2 wt %, greater than or equal to 3 wt %, greater than or equal to 4 wt %, greater than or equal to 5 wt %, greater than or equal to 10 wt %, greater than or equal to 15 wt %, greater than or equal to 20 wt %, or greater than or equal to 25 wt %, versus the total weight of the microemulsion.

The solvent (e.g., the total solvent or a solvent individually) may make up less than or equal to 30 wt % of the microemulsion, less than or equal to 25 wt % of the microemulsion, less than or equal to 20 wt % of the microemulsion, less than or equal to 15 wt % of the microemulsion, less than or equal to 10 wt % of the microemulsion, less than or equal to 5 wt % of the microemulsion, less than or equal to 4 wt %, less than or equal to 3 wt %, less than or equal to 2 wt %, or less than or equal to 1 wt % versus the total weight of the microemulsion.

Combinations of the above-referenced ranges are also possible (e.g., greater than or equal to 1 wt % and less than or equal to 30 wt % of solvent, greater than or equal to 15 wt % and less than or equal to 30 wt % of solvent, or greater than or equal to 20 wt % and less than or equal to 25 wt % solvent, versus the total weight of the microemulsion). In some embodiments, the solvent comprises from 4 wt % to 10 wt %, from 10 wt % to 20 wt %, or from 20 wt %, to 30 wt %, versus the total weight of the microemulsion.

Terpene Solvents

In some embodiments, the solvent of the microemulsion comprises a terpene solvent. In some embodiments, the solvent comprises a terpene solvent and another different type of solvent (e.g., an alcohol). In some embodiments, the terpene solvent comprises a first terpene solvent and a second, different terpene solvent.

Terpene solvents are generally derived biosynthetically from units of isoprene. Terpene solvents may be generally classified as monoterpenes (e.g., having two isoprene units), sesquiterpenes (e.g., having three isoprene units), diterpenes, or the like. The term "terpenoid" includes natural degradation products, such as ionones, and natural and synthetic derivatives, e.g., terpene alcohols, ethers, aldehydes, ketones, acids, esters, epoxides, and hydrogenation products (e.g., see Ullmann's Encyclopedia of Industrial Chemistry, 2012, pages 29-45, herein incorporated by reference). In some embodiments, the terpene is a naturally occurring terpene, such as a citrus terpene or a pine terpene. In some embodiments, the terpene is a non-naturally occurring terpene and/or a chemically modified terpene (e.g., saturated terpene, terpene amine, fluorinated terpene, or silylated terpene). Terpenes that are modified chemically, such as by oxidation or rearrangement of the carbon skeleton, may be referred to as terpenoids. Many references use "terpene" and "terpenoid" interchangeably, and this disclosure will adhere to that usage.

In some embodiments, the terpene solvent is a non-oxygenated terpene solvent. In some embodiments, the terpene solvent is a citrus terpene. In some embodiments, the terpene solvent is d-limonene. In some embodiments, the terpene solvent is dipentene. In some embodiments, the terpene comprises d-limonene, nopol, alpha terpineol, eucalyptol, dipentene, linalool, pinene, alpha-pinene, beta-pinene, alpha-terpinene, geraniol, alpha-terpinyl acetate, menthol, menthone, cineole, citranellol, and combinations thereof. As used herein, "terpene" refers to a single terpene compound or a blend of terpene compounds.

In some embodiments, the terpene solvent is an oxygenated terpene solvent. Non-limiting examples of oxygenated terpene solvents include terpenes containing alcohol, aldehyde, ether, or ketone groups. In some embodiments, the oxygenated terpene solvent comprises an ether-oxygen, for example, eucalyptol, or a carbonyl oxygen, for example, menthone. In some embodiments the terpene solvent comprises a terpene alcohol. Non-limiting examples of terpene alcohols include linalool, geraniol, nopol, α-terpineol, and menthol. Non-limiting examples of oxygenated terpenes include eucalyptol, 1,8-cineol, menthone, and carvone.

Alkyl Aliphatic Carboxylic Acid Ester Solvents

In some embodiments, the solvent of the microemulsion comprises an alkyl aliphatic carboxylic acid ester solvent. As used herein "alkyl aliphatic carboxylic acid ester" refers to a compound or a blend of compounds having the general formula:

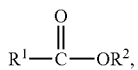

wherein $R^1$ is a $C_6$ to $C_{16}$ optionally substituted aliphatic group, including those bearing heteroatom-containing substituent groups, and $R^2$ is a $C_1$ to $C_6$ alkyl group. In some embodiments, $R^1$ is $C_6$ to $C_{16}$ alkyl. In some embodiments, $R^1$ is substituted with at least one heteroatom-containing substituent group. For example, wherein a blend of compounds is provided and each $R^2$ is $-CH_3$ and each $R^1$ is independently a $C_6$ to $C_{16}$ aliphatic group, the blend of compounds is referred to as methyl aliphatic carboxylic acid esters, or methyl esters. In some embodiments, such alkyl aliphatic carboxylic acid esters may be derived from a fully synthetic process or from natural products, and thus comprise a blend of more than one ester. In some embodiments, the alkyl aliphatic carboxylic acid ester comprises butyl 3-hydroxybutyrate, isopropyl 3-hydroxybutyrate, hexyl 3-hydroxylbutyrate, and combinations thereof.

Non-limiting examples of alkyl aliphatic carboxylic acid esters include methyl octanoate, methyl decanoate, a blend of methyl octanoate and methyl decanoate, and butyl 3-hydroxybutyrate.

Dialkyl Ether Solvents

In some embodiments, the solvent of the microemulsion comprises a solvent that is a branched or unbranched dialkylether solvent having the formula $C_nH_{2n+1}OC_mH_{2m+1}$ wherein n+m is from 6 to 16. In some embodiments, n+m is from 6 to 12, or from 6 to 10, or from 6 to 8. Non-limiting examples of branched or unbranched dialkylether solvents having the formula $C_nH_{2n+1}OC_mH_{2m+1}$ include isomers of $C_3H_7OC_3H_7$, isomers of $C_4H_9OC_3H_7$, isomers of $C_5H_{11}OC_3H_7$, isomers of $C_6H_{13}OC_3H_7$, isomers of $C_4H_9OC_4H_9$, isomers of $C_4H_9OC_5H_{11}$, isomers of $C_4H_9OC_6H_{13}$, isomers of $C_5H_{11}OC_6H_{13}$, and isomers of $C_6H_{13}OC_6H_{13}$. In a particular embodiment, the branched or unbranched dialkylether solvent is an isomer of $C_6H_{13}OC_6H_{13}$ (e.g., dihexylether).

Alcohol Solvents

In some embodiments, the solvent of the microemulsion comprise an alcohol solvent that may be a cyclic or acyclic, branched or unbranched alkane having a carbon chain length from 5 to 12 carbon atoms and substituted with a hydroxyl group. Non-limiting examples of cyclic or acyclic, branched or unbranched alkanes having a carbon chain length from 5 to 12 carbon atoms, and substituted with a hydroxyl group include, isomers of pentanol, isomers of hexanol, isomers of heptanol, isomers of octanol, isomers of nonanol, isomers of decanol, isomers of undecanol, isomers of dodecanol, and combinations thereof. In a particular embodiment, the cyclic or acyclic, branched or unbranched alkane having a carbon chain length from 9 to 12 carbon atoms and substituted with a hydroxyl group is 1-nonanol, 1-decanol, or a combination thereof.

In some embodiments, the alcohol solvent is selected from primary, secondary, and tertiary alcohols having a carbon chain length from 9 to 12 carbon atoms.

Non-limiting examples of cyclic or acyclic, branched or unbranched alkanes having 8 carbon atoms and substituted with a hydroxyl group include isomers of octanol (e.g., 1-octanol, 2-octanol, 3-octanol, 4-octanol), isomers of methyl heptanol, isomers of ethylhexanol (e.g., 2-ethyl-1-hexanol, 3-ethyl-1-hexanol, 4-ethyl-1-hexanol), isomers of dimethylhexanol, isomers of propylpentanol, isomers of methylethylpentanol, isomers of trimethylpentanol, and combinations thereof. In a particular embodiment, the cyclic or acyclic, branched or unbranched alkane having a carbon chain length of 8 carbon atoms and substituted with a hydroxyl group is 1-octanol, 2-ethyl-1-hexanol, or a combination thereof.

Surfactants

In some embodiments, the microemulsion comprises a surfactant. The term surfactant is given its ordinary meaning in the art and generally refers to compounds having an amphiphilic structure which gives them a specific affinity for oil/water-type and water/oil-type interfaces. In some embodiments, the affinity helps the surfactants to reduce the free energy of these interfaces and to stabilize the dispersed phase of a microemulsion.

The term surfactant includes but is not limited to nonionic surfactants, anionic surfactants, cationic surfactants, amphoteric surfactants, zwitterionic surfactants, switchable surfactants, cleavable surfactants, dimeric or gemini surfactants, glucamide surfactants, alkyl polyglycoside surfactants, extended surfactants containing a nonionic spacer arm central extension and an ionic or nonionic polar group, and combinations thereof.

Nonionic surfactants generally do not contain any charges. Anionic surfactants generally possess a net negative charge. Cationic surfactants generally possess a net positive charge. Amphoteric surfactants generally have both positive and negative charges, however, the net charge of the surfactant can be positive, negative, or neutral, depending on the pH of the solution. Zwitterionic surfactants are generally not pH dependent. A zwitterion is a neutral molecule with a positive and a negative electrical charge, though multiple positive and negative charges can be present.

A wide variety of suitable surfactants may be employed in the microemulsions described herein, examples of which are provided in further detail below. The surfactant may make up any suitable amount of the microemulsion by weight. The surfactant (e.g., the total surfactant or a surfactant individually) may make up greater than or equal to 0.1 wt %, greater than or equal to 0.2 wt %, greater than or equal to 0.5 wt %, greater than or equal to 1 wt %, greater than or equal to 2 wt %, greater than or equal to 5 wt %, greater than or equal to 10 wt %, greater than or equal to 20 wt %, greater than or equal to 30 wt %, greater than or equal to 40 wt %, greater than or equal to 50 wt %, or greater than or equal to 60 wt % of the total weight of the microemulsion.

The surfactant (e.g., the total surfactant or a surfactant individually) may make up less than or equal to 65 wt %, less than or equal to 60 wt %, less than or equal to 50 wt %, less than or equal to 40 wt %, less than or equal to 30 wt %, less than or equal to 20 wt %, less than or equal to 10 wt %, less than or equal to 5 wt %, less than or equal to 2 wt %, less than or equal to 1 wt %, or less than or equal to 0.5 wt % versus the total weight of the microemulsion.

Combinations of the above-referenced ranges are also possible (e.g., greater than or equal to 0.1 wt % and less than or equal to 65 wt % surfactant, greater than or equal to 10 wt % and less than or equal to 30 wt % surfactant, or greater than or equal to 20 wt % and less than or equal to 30 wt % surfactant, or greater than or equal to 10 wt % and less than or equal to 50 wt % surfactant, versus the total weight of the microemulsion). In some embodiments, the surfactant comprises from 10 wt % to 20 wt % and from 15 wt % to 25 wt %, or from 20 wt % to 30 wt %, versus the total weight of the microemulsion.

Non-limiting examples of suitable surfactants include nonionic surfactants with linear or branched structure, including, but not limited to alcohol ethoxylates (sometimes referred to as ethoxylated alcohols) having a hydrocarbon chain length of 12 to 15 carbon atoms and having from 7 to 12 EO units.

Non-limiting examples of suitable surfactants include nonionic surfactants with linear or branched structure, including, but not limited to alkoxylated alcohols, alkoxylated fatty alcohols, alkoxylated castor oils, alkoxylated fatty acids, and alkoxylated fatty amides having a hydrocarbon chain of at least 8 carbon atoms and 5 or more units of alkoxylation. The term alkoxylation includes ethoxylation and propoxylation. Other nonionic surfactants include alkyl glycosides and alkyl glucamides.

In some embodiments, the surfactants generally have hydrophile-lipophile balance (HLB) values from 8 to 18 or from 8 to 14.

Non-limiting examples of different surfactants that may be present in the microemulsion are provided below.

Hydrophilic Hydrocarbon Surfactants

In some embodiments, a microemulsion comprises a hydrophilic hydrocarbon surfactant. In some embodiments, the hydrophilic hydrocarbon surfactant comprises an alcohol ethoxylate, wherein the alcohol ethoxylate has a hydrocarbon chain length from 10 to 18 carbon atoms (e.g., from 12 to 15 carbon atoms) and has from 7 to 12 ethylene oxide (EO) units. Non-limiting examples of suitable alcohol ethoxylates include $C_{11}$-$C_{15}$ $E_7$, $C_{12}$-$C_{15}$ $E_9$, $C_{12}$-$C_{15}$ $E_{12}$, $C_{12}$-$C_{18}$ $E_{10}$, and $C_{12}$ $E_7$.

Nonionic Surfactants

In some embodiments, a microemulsion comprises a nonionic surfactant. In some embodiments, the nonionic surfactant is an alkoxylated aliphatic alcohol having from 3 to 40 ethylene oxide (EO) units and having from 0 to 20 propylene oxide (PO) units. The term aliphatic alcohol generally refers to a branched or linear, saturated or unsaturated aliphatic moiety having a carbon chain length from 6 to 18 carbon atoms.

In some embodiments, the nonionic surfactant comprises ethoxylated fatty acids, ethoxylated fatty amines, ethoxylated fatty amides wherein the fatty portion is a branched or linear, saturated or unsaturated aliphatic hydrocarbon moiety having a carbon chain length from 6 to 18 carbon atoms, and combinations thereof.

In some embodiments, the nonionic surfactant comprises an alkoxylated castor oil. In some embodiments, the nonionic surfactant comprises a sorbitan ester derivative. In some embodiments the nonionic surfactant comprises an ethylene oxide-propylene oxide copolymer wherein the total number of EO and PO units is from 8 to 40 units. In some embodiments, the nonionic surfactant comprises an alkoxylated tristyryl phenol having from 6 to 100 total EO and PO units (e.g., tristyrylphenol $E_{16}$).

Anionic Surfactants

In some embodiments, a microemulsion comprises an anionic surfactant. In some embodiments, the anionic surfactant comprises an alkyl propoxylated sulfate surfactant having a carbon chain length from 12 to 15 carbon atoms and having from 6 to 10 PO units, from 6 to 11 PO units, from 6 to 12 PO units, or from 6 to 13 PO units. In other embodiments, the anionic surfactant comprises, alkyl or alkylaryl sulfonates, linear or branched alkyl ether sulfates and sulfonates, alcohol polypropoxylated and/or polyethoxylated sulfates, alkyl or alkylaryl disulfonates, alkyl disulfates, alkyl sulphosuccinates, alkyl ether sulfates, linear or branched ether sulfates, fatty acid carboxylates, alkyl sarcosinates, alkyl phosphates, and combinations thereof. In some embodiments, the alkyl ether sulfate surfactant has a carbon chain length from 8 to 12 carbon atoms and has from 3 to 6 EO units.

In some embodiments, the anionic surfactant comprises a branched or linear, saturated or unsaturated aliphatic sulfate having a carbon chain length from 6 to 18 carbon atoms.

In some embodiments, the anionic surfactant comprises a branched or linear, saturated or unsaturated aliphatic sulfonate having a carbon chain length from 6 to 18 carbon atoms.

In some embodiments, a microemulsion comprises an anionic surfactant that comprises a branched or linear, saturated or unsaturated aliphatic alkoxylated sulfate having a carbon chain length from 6 to 18 carbon atoms and having from 4 to 40 total ethylene oxide (EO) and propylene oxide (PO) units.

In some embodiments, a microemulsion comprises an anionic surfactant that comprises a branched or linear, saturated or unsaturated aliphatic-aromatic sulfate having a carbon chain length from 6 to 18 carbon atoms.

In some embodiments, the anionic surfactant comprises a branched or linear, saturated or unsaturated aliphatic-aromatic sulfonate having a carbon chain length from 6 to 18 carbon atoms.

One Surfactant

In some embodiments, the microemulsion may comprise one surfactant. In some embodiments, the surfactant may be any surfactant disclosed herein.

For example, in some embodiments, the surfactant comprises an anionic alkyl propoxylated sulfate surfactant having a carbon chain length from 12 to 15 carbon atoms and having from 6 to 10 propylene oxide (PO) units, from 6 to 11 PO units, from 6 to 12 PO units, or from 6 to 13 PO units. In some embodiments, use of this surfactant results in a microemulsion with ultra-low interfacial tension (i.e. less than or equal to 0.01 mN/m) between a wide variety of crude oils and the well treatment fluid at various reservoir conditions.

In some embodiments, the surfactant comprises an anionic alkyl propoxylated sulfate surfactant having a carbon chain length from 12 to 15 carbon atoms and having from 3 to 4 PO units, from 4 to 5 PO units, or from 3 to 5 PO units. In some embodiments, use of this surfactant results in a microemulsion with ultra-low interfacial tension (i.e. less than or equal to 0.01 mN/m) between a wide variety of crude oils and the well treatment fluid at various reservoir conditions.

Two Surfactants

In some embodiments, the microemulsion comprises two surfactants. In some embodiments, the two surfactants may each independently be any surfactant disclosed herein (e.g., an anionic alkyl propoxylated sulfate surfactant (e.g., an anionic alkyl propoxylated sulfate surfactant having a carbon chain length of 12 to 15 carbon atoms and having from 3 to 5 PO units and/or an anionic alkyl propoxylated sulfate surfactant having a carbon chain length from 12 to 15 carbon atoms and having from 6 to 13 PO units), a nonionic ethoxylated alcohol surfactant (e.g., a nonionic ethoxylated alcohol surfactant having a carbon chain length from 12 to 15 carbon atoms and having from 7 to 12 EO units), and/or an anionic alkyl ether surfactant (e.g. an anionic alkyl ether surfactant having a carbon chain length from 8 to 12 carbon atoms and having from 3 to 6 EO units)).

For example, in some embodiments, the microemulsion comprises two anionic alkyl propoxylated sulfate surfactants. In some embodiments, the two anionic alkyl propoxylated sulfate surfactants have the same carbon chain length, but different number of PO units. In some embodiments, the microemulsion may comprise a mixture of two anionic alkyl propoxylated sulfates, one having a carbon chain length from 12 to 15 carbon atoms and having from 3 to 5 PO units and the other having a carbon chain length from 12 to 15 carbon atoms and having from 6 to 13 PO units. In some embodiments, the ratio by weight of anionic alkyl propoxylated sulfate surfactant having low PO (e.g., from 3 to 5 PO units) to anionic alkyl propoxylated sulfate surfactant having high PO (e.g., from 6 to 13 PO units) may be from 3:1 to 1:3. In some embodiments, this ratio of the two anionic alkyl propoxylated sulfate surfactants results in microemulsions with ultra-low interfacial tension (i.e. less than or equal to 0.01 mN/m) between a wide variety of crude oil and the well treatment fluid at various reservoir conditions in order to increase crude oil production.

In other embodiments, the microemulsion comprises two different surfactants. In some embodiments of the microemulsion comprising two different surfactants, the first surfactant may comprise one anionic alkyl propoxylated sulfate (e.g. having a carbon chain length having from 12 to 15 carbon atoms and having from 3 to 5 PO units and the second surfactant may comprise one nonionic ethoxylated alcohol surfactant (e.g. having a carbon chain length from 12 to 15 carbon atoms and having from 7 to 12 ethylene oxide (EO) units). In some embodiments, the ratio by weight of anionic alkyl propoxylated sulfate surfactant having low PO (e.g., from 3 to 5 PO units) to nonionic ethoxylated alcohol surfactant may be from 10:1 to 1:10 (e.g., 10:1 to 1:3). In some embodiments, this ratio of the two different surfactants results in microemulsions with ultra-low interfacial tension (i.e. less than or equal to 0.01 mN/m) between a wide variety of crude oil and the well treatment fluid at various reservoir conditions in order to increase crude oil production.

In other embodiments of the microemulsion comprising two different surfactants, the first surfactant may comprise one anionic alkyl propoxylated sulfate (e.g. having a carbon chain length from 12 to 15 carbon atoms and having from 3 to 5 PO units and the second surfactant may comprise one anionic alkyl ether surfactant (e.g. having a carbon chain length from 8 to 12 carbon atoms and having from 3 to 6 EO units. In some embodiments, the ratio by weight of anionic alkyl propoxylated sulfate surfactant having low PO (e.g., from 3 to 5 PO units) to anionic alkyl ether surfactant may be from 1:2 to 1:1. In some embodiments, this ratio of the two different surfactants results in microemulsions with ultra-low interfacial tension (i.e. less than or equal to 0.01 mN/m) between a wide variety of crude oil and the well treatment fluid at various reservoir conditions in order to increase crude oil production.

In other embodiments of the microemulsion comprising two different surfactants, the first surfactant may comprise one anionic alkyl propoxylated sulfate (e.g. having a carbon chain length having from 12 to 15 carbon atoms and having from 6 to 13 PO units and the second surfactant may comprise one nonionic ethoxylated alcohol surfactant (e.g. having a carbon chain length from 12 to 15 carbon atoms and having from 7 to 12 ethylene oxide (EO) units). In some embodiments, the ratio by weight of anionic alkyl propoxylated sulfate surfactant having high PO (e.g., from 6 to 13 PO units) to nonionic ethoxylated alcohol surfactant may be from 10:1 to 1:3. In some embodiments, this ratio of the two different surfactants results in microemulsions with ultra-low interfacial tension (i.e. less than or equal to 0.01 mN/m) between a wide variety of crude oil and the well treatment fluid at various reservoir conditions in order to increase crude oil production.

In other embodiments of the microemulsion comprising two different surfactants, the first surfactant may comprise one anionic alkyl propoxylated sulfate (e.g. having a carbon chain length from 12 to 15 carbon atoms and having from 6 to 13 PO units and the second surfactant may comprise one anionic alkyl ether surfactant (e.g. having a carbon chain length from 8 to 12 carbon atoms and having from 3 to 6 EO units. In some embodiments, the ratio by weight of anionic alkyl propoxylated sulfate surfactant having high PO (e.g., from 6 to 13 PO units) to anionic alkyl ether surfactant may be from 10:1 to 1:5. In some embodiments, this ratio of the two different surfactants results in microemulsions with ultra-low interfacial tension (i.e. less than or equal to 0.01 mN/m) between a wide variety of crude oil and the well treatment fluid at various reservoir conditions in order to increase crude oil production.

Three Surfactants

In some embodiments, the microemulsion comprise three surfactants. In some embodiments, each of the three surfactants may each independently be any surfactant disclosed herein (e.g., an anionic alkyl propoxylated sulfate surfactant (e.g., an anionic alkyl propoxylated sulfate surfactant having a carbon chain length of 12 to 15 carbon atoms and having from 3 to 5 PO units and/or an anionic alkyl propoxylated sulfate surfactant having a carbon chain length from 12 to 15 carbon atoms and having from 6 to 13 PO units), a nonionic ethoxylated alcohol surfactant (e.g., a nonionic ethoxylated alcohol surfactant having a carbon chain length from 12 to 15 carbon atoms and having from 7 to 12 EO units), and/or an anionic alkyl ether surfactant (e.g. an anionic alkyl ether surfactant having a carbon chain length from 8 to 12 carbon atoms and having from 3 to 6 EO units)).

For example, in some embodiments of the microemulsion comprising three surfactants, the three surfactants may comprise two anionic alkyl propoxylated sulfate surfactants and one nonionic ethoxylated alcohol surfactant.

In one embodiment of the microemulsion comprising three surfactants, the first surfactant may comprise an anionic alkyl propoxylated sulfate surfactant having a carbon chain length of 12 to 15 carbon atoms and having from 3 to 5 PO units, the second surfactant may comprise an anionic alkyl propoxylated sulfate surfactant having a carbon chain length from 12 to 15 carbon atoms and having from 6 to 13 PO units, and the third surfactant may comprise a nonionic ethoxylated alcohol surfactant having a carbon chain length from 12 to 15 carbon atoms and having from 7 to 12 EO units. In some embodiments, the ratio by weight of the first surfactant (e.g. anionic alkyl propoxylated sulfate surfactant, $C_{12-15}$ having from 3 to 5 PO units) to the second surfactant (e.g. anionic alkyl propoxylated sulfate surfactant, $C_{12-15}$ having from 6 to 13 PO units) to the third surfactant (e.g. nonionic ethoxylated alcohol surfactant, $C_{12-15}$ having from 7 to 12 EO units) may be from 10:1:0.5 to 1:1:0.1 or may be from 3:1:0.1 to 1:3:0.1. In some embodiments, the ratio by weight of these three surfactants may be 1:1:0.1.

In another embodiment of the microemulsion comprising three surfactants, the first surfactant may comprise an anionic alkyl propoxylated sulfate surfactant having a carbon chain length of 12 to 15 carbon atoms and having from 3 to 5 PO units, the second surfactant may comprise an anionic alkyl propoxylated sulfate surfactant having a carbon chain length from 12 to 15 carbon atoms and having from 6 to 13 PO units, and the third surfactant may comprise an anionic alkyl ether surfactant (e.g. having a carbon chain length from 8 to 12 carbon atoms and having from 3 to 6 EO units). In some embodiments, the ratio by weight of the first surfactant (e.g. anionic alkyl propoxylated sulfate surfactant, $C_{12-15}$ having from 3 to 5 PO units) to the second surfactant (e.g. anionic alkyl propoxylated sulfate surfactant, $C_{12-15}$ having from 6 to 13 PO units) to the third surfactant (e.g. anionic alkyl ether surfactant, $C_{8-12}$ having from 3 to 6 EO units) may be from 10:4:0.1 to 10:4:3 or may be from 4:10:0.1 to 4:10:3 or maybe 10:4:3 to 4:10:3. In some embodiments, the ratio by weight of these three surfactants may be 10:4:3.

In some embodiments, the microemulsion comprises more than three surfactants (e.g., four or five surfactants).

In some embodiments, for the surfactants (or combinations thereof) disclosed herein, the IFT shows a broad minimum for a range of surfactant ratios, meaning that the microemulsion is less sensitive to compositional changes that might occur to it due to the microemulsion's adsorption onto the reservoir rock surfaces.

Co-Solvent

In some embodiments, the microemulsion may comprise a co-solvent. The co-solvent may serve as a coupling agent between the solvent and the surfactant and/or may aid in the stabilization of the microemulsion.

In some embodiments, the co-solvent comprises an alcohol and/or a glycol. Suitable alcohols functioning as a co-solvent comprise butanol, amyl alcohol, methanol, isopropyl alcohol, and/or octanol. Suitable glycols functioning as a co-solvent comprise ethylene glycol, propylene glycol, dipropylene glycol monomethyl ether, triethylene glycol, ethylene glycol monobutyl ether, or combinations thereof.

In some embodiments, the co-solvent (e.g., the total co-solvent) comprises greater than or equal to 1 wt %, greater than or equal to 5 wt %, greater than or equal to 10 wt %, greater than or equal to 15 wt %, or greater than or equal to 20 wt % versus the total microemulsion. In some embodiments, the co-solvent (e.g., the total co-solvent) comprises less than or equal to 50 wt %, less than or equal to 40 wt %, less than or equal to 35 wt %, or less than or equal to 30 wt % versus the total microemulsion. Combinations of these ranges are also possible (e.g., from 1 wt % to 50 wt %, from 1 wt % to 40 wt %, from 1 wt % to 35 wt %, or from 1 wt % to 30 wt %, from 5 wt % to 40 wt %, from 5 wt % to 35 wt %, or from 10 wt % to 30 wt %, versus the total weight of the microemulsion).

In some embodiments, the co-solvent comprises a first co-solvent and a second co-solvent. In some embodiments, the first co-solvent comprises an alcohol. Examples of suitable alcohols may include butanol, amyl alcohol, methanol, isopropyl alcohol, and/or octanol. In some embodiments, the microemulsion comprises greater than or equal to 1 wt %, greater than or equal to 5 wt %, greater than or equal to 10 wt %, greater than or equal to 15 wt %, or greater than or equal to 20 wt % first co-solvent. In some embodiments, the microemulsion comprises less than or equal to 30 wt %, less than or equal to 25 wt %, less than or equal to 20 wt %, less than or equal to 15 wt %, less than or equal to 10 wt %, or less than or equal to 5 wt % first co-solvent. Combinations of these ranges are also possible (e.g., greater than or equal to 1 wt % and less than or equal to 30 wt % first co-solvent).

In some embodiments, the second co-solvent comprises a glycol. Examples of suitable glycols may include ethylene glycol, propylene glycol, dipropylene glycol monomethyl ether, triethylene glycol, ethylene glycol monobutyl ether, or combinations thereof. In some embodiments, the microemulsion comprises greater than or equal to 1 wt %, greater than or equal to 5 wt %, greater than or equal to 10 wt %, or greater than or equal to 15 wt % second co-solvent. In some embodiments, the microemulsion comprises less than or equal to 20 wt %, less than or equal to 15 wt %, less than or equal to 10 wt %, or less than or equal to 5 wt % second co-solvent. Combinations of these ranges are also possible (e.g., greater than or equal to 1 wt % and less than or equal to 20 wt % first co-solvent).

Demulsifier

In some embodiments, the microemulsion comprises a demulsifier. In some embodiments, the demulsifier comprises an alkoxylated polyimine, an alkoxylated polyamine, and/or a polyoxyethylene (50) sorbitol hexaoleate. In some embodiments, the microemulsion comprises greater than or equal to 0.5 wt %, greater than or equal to 1 wt %, greater than or equal to 3 wt %, greater than or equal to 5 wt %, greater than or equal to 10 wt %, or greater than or equal to 15 wt % demulsifier. In some embodiments, the microemulsion comprises less than or equal to 20 wt %, less than or equal to 15 wt %, less than or equal to 10 wt %, or less than or equal to 5 wt % demulsifier. Combinations of these ranges are also possible (e.g., greater than or equal to 0.5 wt % and less than or equal to 20 wt %).

Methods of Using Microemulsions for Well Treatment

In some embodiments, the microemulsion may be used in various methods of treating an oil and/or condensate well during the life cycle of the well, including, but not limited to, stimulation (e.g. hydraulic fracturing), enhanced oil recovery (EOR) such as water flooding, chemical flooding (e.g. alkaline flooding, surfactant flooding, polymer flooding), and coiled tubing applications. In some embodiments, when the microemulsion is combined with a carrier fluid (e.g., brine, water, sea water, fresh water, reverse osmosis water, produced water, treated water, drilling mud, slickwater, linear gel, cross-linked gel, acid, fracturing fluids, etc.), a well treatment fluid is formed and is ready to be pumped or injected into the well (e.g., an oil well, condensate well). The well treatment fluid, comprising the microemulsion, can be pumped (e.g. injected) at the well site, in some embodiments, to enhance the recovery of hydrocarbon fluids produced from a hydrocarbon-bearing subterranean formation, such as crude oil.

Brine is an aqueous solution having total dissolved solids (TDS). As used herein, TDS means the amount of total dissolved solid substances, for example salts, in the carrier fluid. Furthermore, TDS typically defines the ion composition of the carrier fluid. The TDS is measured in parts per million (ppm).

In some embodiments, the well treatment fluid may further comprise additional additives (e.g. proppant, scale inhibitor, friction reducer, biocide, corrosion inhibitor, buffer, viscosifier, clay swelling inhibitor, oxygen scavenger, and/or clay stabilizer), which may be mixed or combined on the fly with the microemulsion at the well site.

In a method of treating a well, a microemulsion may be provided (e.g., a microemulsion comprising water, a surfactant, a solvent, and a co-solvent). In some embodiments, the microemulsion is mixed or combined on the fly with a carrier fluid to form a well treatment fluid. According to some embodiments, the microemulsion is added to the carrier fluid at any of a variety of suitable concentrations. In certain embodiments, the microemulsion may be used or dosed at a concentration of 0.5 gpt to 4.0 gpt of carrier fluid (i.e. 0.5 gallons to 4.0 gallons of microemulsion per thousand gallons of carrier fluid). In certain embodiments, the microemulsion may be used or dosed at a concentration of greater than or equal to 0.5 gpt, greater than or equal to 0.75 gpt, greater than or equal to 1 gpt, greater than or equal to 1.25 gpt, greater than or equal to 1.5 gpt, greater than or equal to 1.75 gpt, greater than or equal to 2 gpt, greater than or equal to 2.25 gpt, greater than or equal to 2.5 gpt, greater than or equal to 2.75 gpt, greater than or equal to 3 gpt, greater than or equal to 3.25 gpt, greater than or equal to 3.5 gpt, or greater than or equal to 3.75 gpt. In some embodiments, the microemulsion may be used or dosed at a concentration of less than or equal to 4 gpt, less than or equal to 3.75 gpt, less than or equal to 3.5 gpt, less than or equal to 3.25 gpt, less than or equal to 3 gpt, less than or equal to 2.75 gpt, less than or equal to 2.5 gpt, less than or equal to 2.25 gpt, less than or equal to 2 gpt, less than or equal to 1.75 gpt, less than or equal to 1.5 gpt, less than or equal to 1.25 gpt, or less than or equal to 1 gpt. Combinations of these ranges are also possible (e.g., greater than or equal to 0.5 gpt and less than or equal to 4 gpt).

In some embodiments, the well treatment fluid, comprising the microemulsion, is injected or pumped at high pressure downhole into the wellbore of a subterranean formation (e.g. into the well of the reservoir) using pumping equipment as known in the art. In some embodiments, the microemulsion that is injected or pumped into the wellbore of the subterranean formation, may achieve ultra-low IFT (i.e. lower than 0.01 mN/m) between the crude oil and the brine at reservoir conditions.

Any suitable method for injecting or pumping the well treatment fluid, comprising the microemulsion, into the wellbore of the subterranean formation may be employed. For example, in some embodiments, the well treatment fluid may be injected or pumped downhole into a subterranean formation (e.g. a reservoir) by injecting it into a well or wellbore in the zone of interest of the subterranean formation and thereafter pressurizing it into the formation for a selected distance. Methods for achieving the placement of a selected quantity of a mixture in a subterranean formation are known in the art. The well may be treated with the well treatment fluid for a suitable period of time. The well treatment fluid and/or other fluids may later be removed from the well using known techniques, including producing the well for hydrocarbons (e.g. crude oil).

EXAMPLES

The following examples are intended to illustrate certain embodiments of the present invention, but do not exemplify the full scope of the invention.

All measurements provided in the following examples were performed using a spinning drop tensiometer (SDT). An SDT can be used in a method, known as the spinning drop technique, to measure the IFT between the crude oil and the diluted microemulsion. The spinning drop technique involves suspending a droplet of crude oil in a rotating body of the diluted microemulsion at high rotational speed. The immiscibility of the liquids, combined with the physical forces acting on the droplet of crude oil, cause the droplet to assume a cylindrical shape. As the IFT decreases to ultra-low values, the cylindrical shaped drop starts to thin and adopts a thread-like shape. Using Vonnegut's equation, the interfacial tension can be calculated from the measured drop radius r with a given speed of rotation and with known densities of the aqueous phase and the crude oil. The length of the cylinder (1) divided by the radius of the cylinder should be greater than 4.

Vonnegut's Equation:

$$IFT = \frac{r^3 \omega^2 \Delta \rho}{4}$$

where r is the radius of the of the oil droplet, w is the rotation speed and zip is the density difference between the diluted microemulsion and the crude oil.

Example 1

Interfacial tensions were measured between crude oil 1 (41° API gravity) and brine 1 (9,800 ppm TDS) and crude oil 2 (36° API gravity) and brine 2 (31,000 ppm TDS) at respective reservoir temperatures (Table 1). Microemulsion (ME A) was diluted at 1 gpt in the brines to achieve ultra-low IFT (i.e. less than or equal to 0.01 mN/m).

ME A comprised between about 10 wt % and about 65 wt % surfactant, between about 30 wt % and about 70 wt % water, between about 1 wt % and about 30 wt % terpene solvent, between about 1 wt % and about 50 wt % co-solvent, and between about 0.5 wt % and about 20 wt % demulsifier, versus the total weight of the microemulsion. The surfactant contained within ME A comprised an alkyl propoxylated sulfate, having a carbon chain length from 12 to 15 carbon atoms and having from 6 to 13 PO units.

As shown in Table 1, ME A achieved ultra-low IFT for both crude oils and their corresponding brines at respective reservoir temperatures.

TABLE 1

| Microemulsion Formulation | Crude Oil (API gravity) | Brine TDS (ppm) | Reservoir Temperature (° C.) | IFT (mN/m) |
| --- | --- | --- | --- | --- |
| ME A (1 gpt) | 41° | 9,800 | 50 | 0.001 |
| ME A (1 gpt) | 36° | 31,000 | 25 | 0.0014 |

Example 2

IFTs were measured between several crude oils and their corresponding brines at respective reservoir temperatures (Table 2). Microemulsions (ME B and ME C) were diluted in the corresponding brines to achieve ultra-low IFT (i.e. less than or equal to 0.01 mN/m).

TABLE 2

| Microemulsion Formulation | Crude Oil (API gravity) | Brine TDS (ppm) | Reservoir Temperature (° C.) | IFT (mN/m) |
|---|---|---|---|---|
| ME B (2 gpt) | 38.1° | 64889 | 80 | 0.006 |
| ME B (2 gpt) | 39.9° | 45181 | 77 | 0.001 |
| ME B (2 gpt) | 51.14° | 34279 | 80 | 0.004 |
| ME C (1 gpt) | 30.9° | 40,354 | 52 | 0.00095 |

ME B and ME C comprised between about 10 wt % and about 65 wt % surfactant, between about 30 wt % and about 70 wt % water, between about 1 wt % and about 30 wt % terpene solvent, between about 1 wt % and about 50 wt % co-solvent, and between about 0.5 wt % and about 20 wt % demulsifier, versus the total weight of the microemulsion. Surfactants contained within these microemulsions comprised a mixture of two alkyl propoxylated sulfates, one having a carbon chain length from 12 to 15 carbon atoms and having from 3 to 5 PO units and the other having a carbon chain length from 12 to 15 carbon atoms and from 6 to 13 PO units. The ratio by weight of alkyl propoxylated sulfate having low PO (from 3 to 5 PO units) to alkyl propoxylated sulfate having high PO (from 6 to 13 PO units) was 3:1 for ME B and 1:3 for ME C. As shown in Table 2, ME B and ME C achieved ultra-low IFT for the five crude oils and their corresponding brines at respective reservoir temperatures.

Example 3

Interfacial tension was measured between a crude oil from the Anadarko basin and its corresponding brine at 35° C. (Table 3). Microemulsion (ME D) was diluted at 1 gpt in the corresponding brine to achieve ultra-low IFT (i.e. less than or equal to 0.01 mN/m).

TABLE 3

| Microemulsion Formulation | Crude Oil (API gravity) | Brine TDS (ppm) | Reservoir Temperature (° C.) | IFT (mN/m) |
|---|---|---|---|---|
| ME D (1 gpt) | 39.8° | 111,673 | 35 | 0.008 |

ME D comprised between about 10 wt % and about 65 wt % surfactant, between about 30 wt % and about 70 wt % water, between about 1 wt % and about 30 wt % terpene solvent, between about 1 wt % and about 50 wt % co-solvent, and between about 0.5 wt % and about 20 wt % demulsifier, versus the total weight of the microemulsion. Surfactants contained within ME D comprised a mixture of one alkyl propoxylated sulfate, having a carbon chain length from 12 to 15 carbon atoms and having from 3 to 5 PO units and one nonionic ethoxylated alcohol surfactant having a carbon chain length from 12 to 15 carbon atoms and having from 7 to 12 EO units. The ratio by weight of alkyl propoxylated sulfate having low PO (from 3 to 5 PO units) to nonionic ethoxylated alcohol was 1:1.4. As shown in Table 3, ME D achieved ultra-low IFT for this crude oil and its corresponding brine at reservoir temperature.

Example 4

IFTs were measured between several crude oils and their corresponding brines at respective reservoir temperatures (Table 4). Microemulsion (ME E) was diluted at 2 gpt in the brines to achieve ultra-low IFT (i.e. less than or equal to 0.01 mN/m).

TABLE 4

| Microemulsion Formulation | Crude Oil (API gravity) | Brine TDS (ppm) | Reservoir Temperature (° C.) | IFT (mN/m) |
|---|---|---|---|---|
| ME E (2 gpt) | 37.3 | 142,781 | 66 | 0.007 |
| ME E (2 gpt) | 37.6° | 114,821 | 74 | 0.003 |
| ME E (2 gpt) | 35.9° | 113,517 | 77 | 0.005 |

ME E comprised between about 10 wt % and about 65 wt % surfactant, between about 30 wt % and about 70 wt % water, between about 1 wt % and about 30 wt % terpene solvent, between about 1 wt % and about 50 wt % co-solvent, and between about 0.5 wt % and about 20 wt % demulsifier, versus the total weight of the microemulsion. Surfactants contained within ME E comprised a mixture of one alkyl propoxylated sulfate, having a carbon chain length from 12 to 15 carbon atoms and having from 3 to 5 PO units and one alkyl ether sulfate, having a carbon chain length from 8 to 12 carbon atoms and having from 3 to 6 EO units. The ratio by weight of alkyl propoxylated sulfate having low PO (from 3 to 5 PO units) to alkyl ether sulfate was 1:1.3. As shown in Table 4, ME E achieved ultra-low IFT for the three different crude oils and their corresponding brines at respective reservoir temperatures.

Example 5

IFTs were measured between crude oil 3 (28.6° API gravity, 26% saturates, 48% aromatics, 25% resins, and 1.6% asphaltenes) and brine 3 (27,100 ppm TDS) at reservoir temperature (50° C.) (FIG. 1). Microemulsions (ME1 to ME9) were diluted at 1 gpt in the brine to achieve ultra-low IFT (i.e. lower than 0.01 mN/m). The ratio by weight of the surfactants within the microemulsions was changed in order to find the lowest IFT.

ME1 to ME9 each comprised between about 10 wt % and about 65 wt % surfactant, between about 30 wt % and about 70 wt % water, between about 1 wt % and about 30 wt % terpene solvent, between about 1 wt % and about 50 wt % co-solvent, and between about 0.5 wt % and about 20 wt % demulsifier, versus the total weight of each microemulsion, respectively. Surfactants contained within each of ME1 to ME9 comprised a mixture of a nonionic ethoxylated alcohol surfactant having a carbon chain length from 12 to 15 carbon atoms and having from 7 to 12 EO units and two alkyl propoxylated sulfates, one having a carbon chain length from 12 to 15 carbon atoms and having from 3 to 5 PO units and the other having a carbon chain length from 12 to 15 carbon atoms and having from 6 to 13 PO units. The ratio by weight of alkyl propoxylated sulfate having low PO (from 3 to 5 PO units) to alkyl propoxylated sulfate having high PO (from 6 to 13 PO units) to nonionic ethoxylated alcohol for each of ME1 to ME9 was varied from 10:1:0.5 to 1:1:0.1.

As shown in FIG. 1, five microemulsions (ME4, ME5, ME6, ME7, and ME8) each achieved an ultra-low IFT (i.e. lower than 0.01 mN/m) between crude oil 3 and brine 3. ME6 achieved the lowest IFT (0.0003 mN/m). The IFT curve in FIG. 1 shows a broad minimum as the surfactant ratio contained within each microemulsion was changed.

The fact that the minimum IFT was broad means that the IFT had less sensitivity to surfactant ratios by weight changes, within each of the microemulsions.

Example 6

Figure 2:
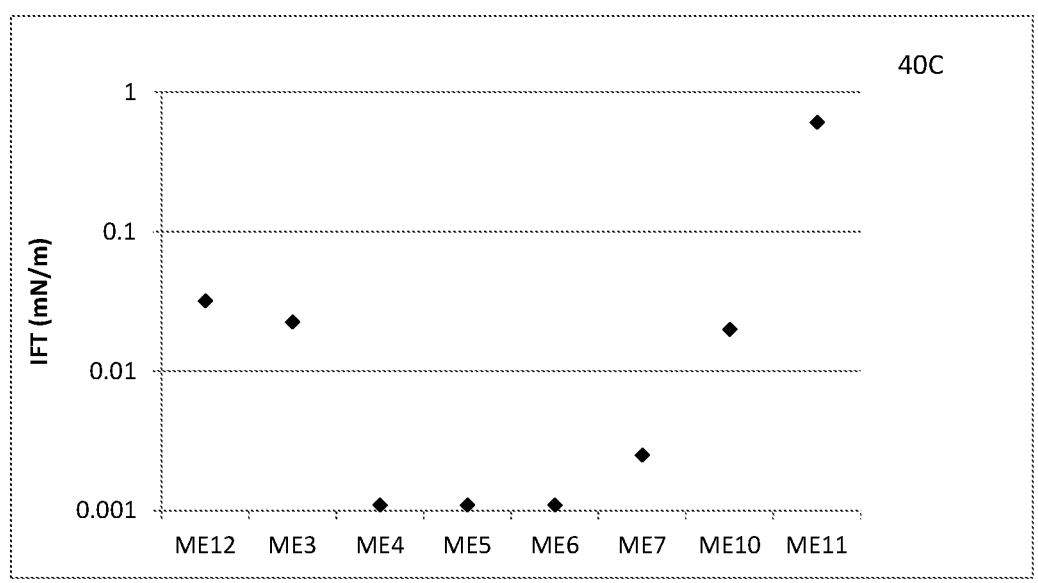
FIG. 2 shows the IFT measured between crude oil 4 (28.6° API gravity, 25% saturates, 59% aromatics, 15% resins, and 1% asphaltenes) and brine 4 (29,711 ppm TDS) at reservoir temperature (40° C.). Microemulsions comprising three surfactants (i.e., ME3, ME4, ME5, ME6, ME7, ME10, ME11 and ME12) were used at 1 gpt to achieve ultra-low IFT. The ratio by weight of the three surfactants to each other within each microemulsion were changed in order to determine the lowest IFT.

IFTs were measured between crude oil 4 (25% saturates, 59% aromatics, 15% resins, and 1% asphaltenes) and brine 4 (29,711 ppm TDS) at reservoir temperature (40° C.) as shown in FIG. 2. Microemulsions (ME3, ME4, ME5, ME6, ME7, ME10, ME11 and ME12) were each used at 1 gpt to achieve ultra-low IFT (i.e. less than or equal to 0.01 mN/m). The ratio by weight of the surfactants within each microemulsion was changed in order to find the lowest IFT.

ME3, ME4, ME5, ME6, ME7, ME10, ME11 and ME12 each comprised between about 10 wt % and about 65 wt % surfactant, between about 30 wt % and about 70 wt % water, between about 1 wt % and about 30 wt % terpene solvent, between about 1 wt % and about 50 wt % co-solvent, and between about 0.5 wt % and about 20 wt % demulsifier, versus the total weight of the microemulsion. Surfactants contained within each of the microemulsions comprised a mixture of a nonionic ethoxylated alcohol surfactant having a carbon chain length from 12 to 15 carbon atoms and having from 7 to 12 EO units and two alkyl propoxylated sulfates, one having a carbon chain length from 12 to 15 carbon atoms and having from 3 to 5 PO units and the other one having a carbon chain length from 12 to 15 carbon atoms and having from 6 to 13 PO units. The ratio by weight of alkyl propoxylated sulfate having low PO (from 3 to 5 PO units) to alkyl propoxylated sulfate having high PO (from 6 to 13 PO units) to nonionic ethoxylated alcohol surfactant for each of ME3 to ME12 was varied from 10:1:0.5 to 1:1:0.1.

As shown in FIG. 2, four microemulsions (ME4, ME5, ME6 and ME7) each achieved an ultra-low IFT (i.e. less than or equal to 0.01 mN/m) between crude oil 4 and brine 4.

ME4, ME5 and ME6 had the lowest IFT (0.0011 mN/m). The IFT curve in FIG. 2 shows a broad minimum as the surfactant ratio by weight within the microemulsion was changed.

Example 7

Table 5 below shows the IFT measured between two different crude oils and brines using 1 gpt of different microemulsions (ME14 to ME15) at representative reservoir temperatures. Each of these microemulsions contained the same three surfactants (e.g. two alkyl propoxylated sulfate surfactants and one nonionic ethoxylated alcohol surfactant) with a varied ratio by weight to each other to determine which ratio achieved the lowest IFT for each crude oil and brine.

As shown in Table 5, ME13 and ME14 each achieved ultra-low IFT (i.e. less than or equal to 0.01 mN/m). The ratio by weight of the surfactants to each other within each of these microemulsions was changed in order to find the lowest IFT.

ME13 and ME14 each comprised between about 10 wt % and about 65 wt % surfactant, between about 30 wt % and about 70 wt % water, between about 1 wt % and about 30 wt % terpene solvent, between about 1 wt % and about 50 wt % co-solvent, and between about 0.5 wt % and about 20 wt % demulsifier, versus the total weight of the microemulsion. Surfactants contained within the microemulsion comprised a mixture of a nonionic ethoxylated alcohol surfactant having a carbon chain length from 12 to 15 carbon atoms and having from 7 to 12 EO units and two alkyl propoxylated sulfates, one having a carbon chain length from 12 to 15 carbon atoms and having from 3 to 5 PO units and the other having a carbon chain length from 12 to 15 carbon atoms and having from 6 to 13 PO units. The ratio by weight of alkyl propoxylated sulfate having low PO (from 3 to 5 PO units) to alkyl propoxylated sulfate having high PO (from 6 to 13 PO) to nonionic ethoxylated alcohol surfactant for each of ME13 to ME14 was varied from 3:1:0.1 to 1:3:0.1.

TABLE 5

| Microemulsion Formulation | Crude Oil (API gravity) | Brine TDS (ppm) | Reservoir Temperature (° C.) | IFT (mN/m) |
|---|---|---|---|---|
| ME13 (1 gpt) | 30.5° | 29,425 | 80 | 0.001 |
| ME14 (1 gpt) | 31.4° | 8580 | 60 | 0.0062 |

Example 8

Table 6 below, shows the IFT measured using crude oil 5 (36° API gravity) and brine 5 (31,000 ppm TDS) at reservoir temperature (25° C.). Two microemulsions (ME15 and ME16) were used at 1 gpt. The only difference between ME15 and ME16 was the type of solvent contained within the microemulsion. The concentration, type and ratio of the surfactants by weight contained within the two MEs were the same. ME15 contained a linear alkane solvent and ME16 contained a terpene solvent.

As shown in Table 6, the type of solvent within the microemulsion affected achievement of ultra-low IFT. By changing the solvent contained within the microemulsion from a linear alkane solvent to a terpene solvent, the IFT was decreased from 0.15 to 0.0007 mN/m. Without wishing to be bound to theory, the linear alkane solvent contained within ME15 may have increased the EACN of the crude oil, and thereby prevented the IFT from reaching an ultra-low value. Using ME16, the terpene solvent did match the EACN of crude oil 2 and achieved an ultra-low IFT of 0.0007 mN/m.

ME15 and ME16 each comprised between about 10 wt % and about 65 wt % surfactant, between about 30 wt % and about 70 wt % water, between about 1 wt % and about 30 wt % solvent, between about 1 wt % and about 50 wt % co-solvent, and between about 0.5 wt % and about 20 wt % demulsifier, versus the total weight of the microemulsion. Surfactants contained within each of the microemulsions comprised a mixture of a nonionic ethoxylated alcohol surfactant having a carbon chain length from 12 to 15 carbon atoms and having from 7 to 12 EO units and two alkyl propoxylated sulfates, one having a carbon chain length of 12 to 15 carbon atoms and having from 3 to 5 PO units and the other having a carbon chain length of 12 to 15 carbon atoms and having from 6 to 13 PO units. The ratio by weight of alkyl propoxylated sulfate having low PO (from 3 to 5 PO units) to alkyl propoxylated sulfate having high PO (from 6 to 13 PO) to nonionic ethoxylated alcohol surfactant for ME15 and ME16 was 1:1:0.1.

TABLE 6

| Microemulsion Formulation | IFT (mN/m) |
|---|---|
| ME15 (1 gpt) | 0.15 |
| ME16 (1 gpt) | 0.0007 |

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all examples, parameters, materials, and configurations described herein are meant to be exemplary and that the actual examples, parameters, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, e.g. elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, e.g. the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element or a list of elements. In general, the term "or" as used herein shall only be interpreted as indicating exclusive alternatives (e.g. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "between" in reference to a range of elements or a range of units should be understood to include the lower and upper range of the elements or the lower and upper range of the units, respectively. For example, the phrase describing a molecule having "between 6 to 12 carbon atoms" should mean a molecule that may have from 6 carbon atoms to 12 carbon atoms, inclusively. For example, the phrase describing a composition comprising "between about 5 wt % and about 40 wt % surfactant" should mean the composition may have from about 5 wt % to about 40 wt % surfactant, inclusively.

As used herein in the specification and in the claims, the words "from" and "to", when used in conjunction in a phrase, in reference to a range of elements or a range of units should be understood to include the lower and upper range of the elements or the lower and upper range of the units, respectively. For example, the phrase describing the weight percentage of a component of a composition having "from 10 wt % to 20 wt %" of the component, should mean that the component may have from 10 wt % to 20 wt %, inclusively. For example, the phrase describing a molecule having "from 6 to 12 carbon atoms" should mean a molecule that may have 6 carbon atoms to 12 carbon atoms, inclusively.

As used herein in the specification and in the claims, a range of numerical values associate with a unit of measure, should be understood to include the lower and upper range of the unit of measure. For example, a phrase describing a temperature range of "−20° C. to 60° C." should mean a temperature from −20° C. to 60° C., inclusively.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, e.g. to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A microemulsion, comprising:
   water;
   a terpene solvent;
   a surfactant comprising an anionic alkyl propoxylated sulfate surfactant having a carbon chain length from 12 to 15 carbon atoms and having from 6 to 13 propylene oxide units and an anionic alkyl ether sulfate surfactant having a carbon chain length from 8 to 12 carbon atoms and having from 3 to 6 ethylene oxide units, wherein the ratio by weight of the anionic alkyl propoxylated sulfate surfactant to the anionic alkyl ether sulfate surfactant is from 10:1 to 1:5; and
   a co-solvent.

2. The microemulsion of claim 1 further comprising a second surfactant comprising an anionic alkyl propoxylated sulfate surfactant having a carbon chain length from 12 to 15 carbon atoms and having from 3 to 5 propylene oxide units.

3. The microemulsion of claim 1, further comprising a demulsifier.

4. The microemulsion of claim 1, wherein the microemulsion has an interfacial tension of greater than or equal to 0.00001 mN/m and less than or equal to 0.01 mN/m.

5. The microemulsion of claim 1, wherein the total amount of surfactant present in the microemulsion is greater than or equal to 10 wt % and less than or equal to 65 wt %.

6. A microemulsion, comprising:
   water;
   a terpene solvent;
   a surfactant comprising an anionic alkyl propoxylated sulfate surfactant having a carbon chain length from 12 to 15 carbon atoms and having from 3 to 5 propylene oxide units and an anionic alkyl ether sulfate surfactant having a carbon chain length from 8 to 12 carbon atoms and having from 3 to 6 ethylene oxide units, wherein the ratio by weight of the anionic alkyl propoxylated sulfate surfactant to the anionic alkyl ether sulfate surfactant is from 1:2 to 1:1; and
   a co-solvent.

7. The microemulsion of claim 6, further comprising a second surfactant comprising a nonionic ethoxylated alcohol surfactant having a carbon chain length from 12 to 15 carbon atoms and from 7 to 12 ethylene oxide units.

8. A method, comprising injecting a microemulsion into an oil and/or condensate well, wherein the microemulsion comprises:
   water;
   a terpene solvent;
   a surfactant comprising an anionic alkyl propoxylated sulfate surfactant having a carbon chain length from 12 to 15 carbon atoms and having from 6 to 13 propylene oxide units and an anionic alkyl ether sulfate surfactant having a carbon chain length from 8 to 12 carbon atoms and having from 3 to 6 ethylene oxide units, wherein the ratio by weight of the anionic alkyl propoxylated sulfate surfactant to the anionic alkyl ether sulfate surfactant is from 10:1 to 1:5; and
   a co-solvent.

9. The method of claim 8, wherein the microemulsion further comprises a second surfactant comprising an anionic alkyl propoxylated sulfate surfactant having a carbon chain length from 12 to 15 carbon atoms and having from 3 to 5 propylene oxide units.

10. The method of claim 8, wherein the microemulsion further comprises a demulsifier.

11. The method of claim 8, wherein the microemulsion has an interfacial tension of greater than or equal to 0.00001 mN/m and less than or equal to 0.01 mN/m.

12. The method of claim 8, wherein the total amount of surfactant present in the microemulsion is greater than or equal to 10 wt % and less than or equal to 65 wt %.

13. A method, comprising injecting the microemulsion of claim 6 into an oil and/or condensate well.

14. The method of claim 13, wherein the microemulsion further comprises a second surfactant comprising a nonionic ethoxylated alcohol surfactant having a carbon chain length from 12 to 15 carbon atoms and from 7 to 12 ethylene oxide units.

* * * * *